US011465524B2

(12) United States Patent
Moriya et al.

(10) Patent No.: US 11,465,524 B2
(45) Date of Patent: *Oct. 11, 2022

(54) VEHICLE

(71) Applicant: SUBARU CORPORATION, Tokyo (JP)

(72) Inventors: Fumiyuki Moriya, Tokyo (JP); Yuta Totsuka, Tokyo (JP); Hidehiro Takagi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 264 days.

This patent is subject to a terminal disclaimer.

(21) Appl. No.: 16/709,619

(22) Filed: Dec. 10, 2019

(65) Prior Publication Data

US 2020/0247260 A1    Aug. 6, 2020

(30) Foreign Application Priority Data

Feb. 5, 2019   (JP) .............................. JP2019-018864

(51) Int. Cl.
*B60L 53/62* (2019.01)
*B60K 6/28* (2007.10)
(Continued)

(52) U.S. Cl.
CPC ................ *B60L 53/62* (2019.02); *B60K 6/28* (2013.01); *B60L 1/00* (2013.01); *B60L 53/12* (2019.02); *B60L 53/305* (2019.02); *B60R 16/033* (2013.01); *H02J 7/007* (2013.01); *H02J 7/00032* (2020.01); *H02J 7/0047* (2013.01); *H02J 50/10* (2016.02); *H04W 4/40* (2018.02); *B60L 1/003* (2013.01); *B60L 2210/42* (2013.01); *B60L 2250/12* (2013.01); *B60L 2250/16* (2013.01); *B60Y 2200/91* (2013.01); *B60Y 2200/92* (2013.01); *B60Y 2300/91* (2013.01)

(58) Field of Classification Search
CPC .. B60L 3/04; B60L 53/12; B60L 1/006; B60L 2270/20; B60L 53/62; B60L 1/00; B60L 2250/12; B60L 2250/16; B60K 6/28; H02J 7/0047; H02J 50/10; H04W 4/40

See application file for complete search history.

(56) References Cited

U.S. PATENT DOCUMENTS

2013/0307471 A1* 11/2013 Ichikawa ............ B60L 15/2009
320/108

FOREIGN PATENT DOCUMENTS

JP          2006-088865 A    4/2006

* cited by examiner

*Primary Examiner* — Rexford N Barnie
*Assistant Examiner* — Elim Ortiz
(74) *Attorney, Agent, or Firm* — McGinn I.P. Law Group, PLLC.

(57) ABSTRACT

A vehicle includes a battery, an electric power acquirer, a power supply unit, first and second relays, a charging controller, and a first notification processor. The first relay connects the battery to a power supply line or disconnects the battery from the power supply line. The charging controller switches, on a request for charging of the battery with the first relay in a connected state, the first relay to a disconnected state, brings the second relay to a connected state, and switches the first relay to a connected state to start the charging of the battery. The first notification processor gives, on the request for the charging of the battery, a user a notification of temporary shutdown of the power supply unit at a start of the charging of the battery.

17 Claims, 4 Drawing Sheets

(51) Int. Cl.
  *B60L 53/12* (2019.01)
  *B60L 53/30* (2019.01)
  *B60R 16/033* (2006.01)
  *B60L 1/00* (2006.01)
  *H02J 7/00* (2006.01)
  *H02J 50/10* (2016.01)
  *H04W 4/40* (2018.01)

VEHICLE

CROSS-REFERENCE TO RELATED APPLICATIONS

This application claims priority from Japanese Patent Application No. 2019-018864 filed on Feb. 5, 2019, the entire contents of which are hereby incorporated by reference.

BACKGROUND

The technology relates to a vehicle including a battery and an electric power acquirer that acquires electric power for battery charging from outside.

Vehicles such as electric vehicles (EV) and plug-in hybrid electric vehicles (PHEV) are equipped with a high-voltage battery. The high-voltage battery has large capacity and accumulates electric power for travel of a vehicle. Sometimes the high-voltage battery is used as a power supply for on-vehicle devices such as an air conditioner and a navigation system. Further, in recent years, utilities have been put into practical use. The utilities are provided for AC power supply from a power receptacle attached inside or outside a vehicle body. The high-voltage battery has also been used as a power supply of the utilities.

Such vehicles are able to acquire electric power from an external power supply and to charge the high-voltage battery. Methods of charging may include non-contact charging and wired charging. The non-contact charging includes acquiring electric power non-contact from a power transmitting coil of ground facilities. The wired charging includes acquiring electric power by wire through a charging connector.

Generally, in vehicles equipped with a high-voltage battery, the high-voltage battery and a power supply line of a system are disconnectable through a system main relay, in order to hinder a voltage of the high-voltage battery from being unduly outputted to the power supply line. Moreover, in vehicles that is able to charge a high-voltage battery from an external power supply, an electric power acquirer and a power supply line are disconnectable through a charging relay, in order to hinder a voltage of the high-voltage battery from being unnecessarily outputted to the electric power acquirer.

As to the related techniques, reference can be made to Japanese Unexamined Patent Application Publication (JP-A) No. 2006-088865 that discloses a technique of allowing an occupant to make a selection, with the use of a touchscreen, as to whether or not to put limitation on an output for a load, in charging a battery of the vehicle.

SUMMARY

An aspect of the technology provides a vehicle including a battery, an electric power acquirer, a power supply unit, a first relay, a second relay, a charging controller, and a first notification processor. The battery is configured to accumulate electric power for travel of the vehicle. The electric power acquirer is configured to acquire charging electric power from outside. The power supply unit is able to provide a power supply from the battery to a device other than a traveling motor. The first relay is configured to connect the battery to a power supply line or to disconnect the battery from the power supply line. The second relay is configured to connect the electric power acquirer to the power supply line or to disconnect the electric power acquirer from the power supply line. The charging controller is configured to switch, on a request for charging of the battery with the first relay in a connected state, the first relay to a disconnected state, bring the second relay to a connected state, and switch the first relay to a connected state to start the charging of the battery. The first notification processor is configured to give, on the request for the charging of the battery, a user a notification of temporary shutdown of the power supply unit at a start of the charging of the battery.

An aspect of the technology provides a vehicle including a battery, an electric power acquirer, a power supply unit, a first relay, a second relay, and a second notification processor. The battery is configured to accumulate electric power for travel of the vehicle. The electric power acquirer includes a power receiving coil and is configured to acquire charging electric power non-contact through the power receiving coil. The power supply unit is able to provide a power supply from the battery to a device other than a traveling motor. The first relay is configured to connect the battery to a power supply line or to disconnect the battery from the power supply line. The second relay is configured to connect the electric power acquirer to the power supply line or to disconnect the electric power acquirer from the power supply line. The second notification processor is configured to give a user a notification of temporary shutdown of the power supply unit at a start of charging of the battery, on the condition that a command to start up the power supply unit is made with the power-receiving coil positioned to be available for electric power reception from a power transmitting coil of ground facilities.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
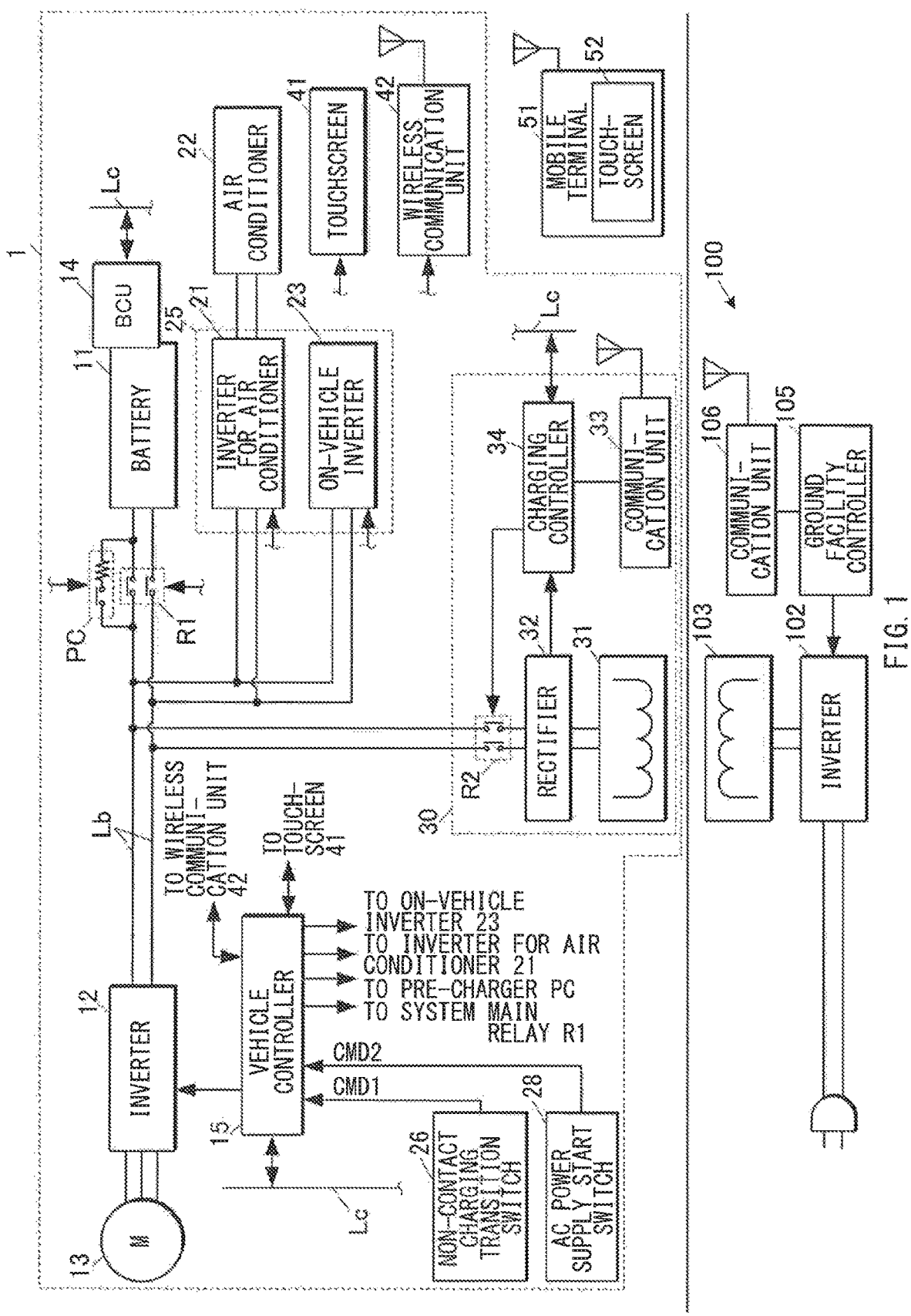
FIG. 1 is a block diagram illustrating a vehicle according to an embodiment of the technology.

In a vehicle including a high-voltage battery, a relay switching control is carried out in order to hinder an excessive current such as a rush current from flowing through a relay. For example, at a start of charging with a charging relay switched to a connected state, a system main relay is once brought to a disconnected state, causing isolation of the high-voltage battery from a power supply line. Thereafter, the charging relay is switched to the connected state. Then, the system main relay is switched again to a connected state. To the system main relay, attached is a protection mechanism. The protection mechanism allows a voltage between both ends of the system main relay to change mildly. Accordingly, the procedure described above makes it possible to couple the high-voltage battery and an electric power acquirer through the power supply line, without letting an excessive current flow through both the charging relay and the system main relay.

In a case where the high-voltage battery is charged while an on-vehicle device or an electric device coupled to a power receptacle of utilities is in operation, however, the relay switching control as described above may cause possibility of temporary shutoff of a power supply to the on-vehicle device or the electric device. The shutoff of the power supply is an unexpected situation for a user, and causes shutdown of the device the user is using, which would give the user the sense of incongruity.

It is desirable to provide a vehicle that makes it possible to alleviate the sense of incongruity given to a user in relation to the use of a power supply unit, in charging a battery from an external power supply.

In the following, some preferred but non-limiting embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated.

FIG. 1 is a block diagram illustrating a vehicle according to an embodiment of the technology.

A vehicle 1 according to an embodiment of the technology may be, for example, an electric vehicle (EV) and a hybrid electric vehicle (HEV). The vehicle 1 may include a battery 11, a traveling motor 13, an inverter 12, and a battery control unit (BCU) 14. The battery 11 may accumulate electric power for travel of the vehicle 1. The traveling motor 13 may drive a driving wheel. The inverter 12 may convert electric power between the battery 11 and the traveling motor 13. The BCU 14 may manage a state of the battery 11. The battery 11 may output a high voltage that drives the traveling motor 13 and may be referred to as a high-voltage battery. The battery 11 may include, for example, a secondary battery such as a lithium-ion storage battery or a nickel hydrogen storage battery.

The vehicle 1 may further include a system main relay R1, a pre-charger PC, and a power supply line Lb. The battery 11 may be coupled to the power supply line Lb through the system main relay R1 and the pre-charger PC. The pre-charger PC may bring voltages at both ends of the system main relay R1 slowly closer to each other, with the system main relay R1 in a disconnected state. To connect the battery 11 to the power supply line Lb, first, the pre-charger PC may be switched to a connected state, thereby reducing a potential difference between both ends of the system main relay R1. Thereafter, the system main relay R1 may be switched to a connected state and the pre-charger PC may be switched to a disconnected state. This makes it possible to switch the system main relay R1 from the disconnected state to the connected state, without an excessive current flowing through the system main relay R1. Hereinafter, description that the system main relay R1 is switched to the connected state is assumed to include the forgoing switching operation of the pre-charger PC.

In one embodiment of the technology, the system main relay R1 may serve as a "first relay".

The vehicle 1 may further include a vehicle controller 15. The vehicle controller 15 may perform a travel control of the vehicle 1 and a control of each part of the vehicle 1. The vehicle controller 15 may include an electronic control unit (ECU) including a central processing unit (CPU), a storage, and a random access memory (RAM). The storage may hold control programs to be executed by the CPU and control data. The RAM is provided for expansion of data by the CPU. The vehicle controller 15 may include a single ECU, or alternatively, the vehicle controller 15 may include a plurality of ECUs that operate in cooperation with one another.

In one embodiment of the technology, the vehicle controller 15 may serve as a "first notification processor", a "determination unit", and a "second notification processor".

For example, the vehicle controller 15 may drive the inverter 12 to cause powering operation or regenerative operation of the traveling motor 13, in accordance with an operation of a driving operation unit, e.g., an undepicted pedal and a shift lever. This leads to the travel of the vehicle 1 in accordance with a driving operation. In addition, the vehicle controller 15 may perform a start-up control of a power supply unit 25, a switching control of the system main relay R1 and the pre-charger PC, display processing of a touchscreen 41, operation input processing of the touchscreen 41, and communication processing with a mobile terminal 51 through a wireless communication unit 42.

The vehicle 1 may further include a non-contact charging transition switch 26 and an AC power supply start switch 28. The non-contact charging transition switch 26 and the AC power supply start switch 28 may be provided on, for example, a dashboard. The occupant of the vehicle 1 may operate them, to give the vehicle controller 15 an operation signal such as a charging transition command CMD1 and a start-up command CMD2 of the on-vehicle inverter 23. The touchscreen 41 may be provided on the dashboard, allowing the vehicle controller 15 to output an image through the touchscreen 41 and to receive the operation signal from the touchscreen 41.

In one embodiment of the technology, the non-contact charging transition switch 26 may serve as a "charging transition switch". In one embodiment of the technology, the touchscreen 41 may serve as an "output unit". In one embodiment of the technology, the charging transition command CMD1 may serve as a "request for charging". In one embodiment of the technology, the start-up command CMD2 may serve as a "command to start up the power supply unit".

The vehicle 1 may further include the wireless communication unit 42. By communication through the wireless communication unit 42, the vehicle controller 15 is able to transmit specific data to the mobile terminal 51 the user carries with them, and is able to receive data regarding an operation made by the user from the mobile terminal 51. The user is able to operate a touchscreen 52 of the mobile terminal 51, to make an operation of selecting one of display buttons displayed on the touchscreen 52. Furthermore, the mobile terminal 51 may output an operation view to cause a transition to non-contact charging. The user may operate the operation view, and thereby give the charging transition command CMD1 to the vehicle controller 15. The communication by the wireless communication unit 42 may be carried out through wireless LAN (Local Area Network), short distance wireless communication, or communication through a mobile telephone base station.

The vehicle 1 may further include the power supply unit 25. The power supply unit 25 is configured to supply a power supply voltage to an electric device other than the traveling motor 13, using electric power of the battery 11. The power supply unit 25 may include, for example, an inverter for air conditioner 21, an on-vehicle inverter 23, and an undepicted heater switch. The inverter for air conditioner 21 may convert electric power of the battery 11 and send a driving current to the air conditioner 22, that is, for example, to a compressor. The on-vehicle inverter 23 may convert electric power of the battery 11 into an AC power supply voltage, and output the AC power supply voltage to an undepicted inside-cabin power receptacle. The occupant of the vehicle 1 may drive the on-vehicle inverter 23, and thereby be able to couple, for example, a home electric appliance to the inside-cabin power receptacle and use the home electric appliance. To the heater switch, coupled may be a positive temperature coefficient (PTC) heater as a load. The PTC heater may heat air conditioning coolant or the battery 11. Turning on the heater switch causes electric power supply to the PTC heater.

Instead of the inside-cabin power receptacle, or in addition to the inside-cabin power receptacle, a vehicle exterior power receptacle or an indoor power receptacle may be coupled to the on-vehicle inverter 23. The vehicle exterior power receptacle or the indoor power receptacle makes it possible to use an electric appliance near the vehicle 1, or outside a cabin of the vehicle 1. In another alternative, instead of the on-vehicle inverter 23, the power supply unit 25 may include a connector and a relay to which an external inverter may be coupled. Coupling the external inverter to the connector and turning the relay on causes electric power supply from the power supply line Lb to the inverter in accordance with a control by the vehicle controller 15, causing an AC power supply voltage to be outputted from the external inverter to the vehicle exterior power receptacle. Alternatively, the AC power supply voltage may be outputted from the external inverter to a household power receptacle. A configuration of supplying the AC power supply voltage from the vehicle 1 to vehicle exterior may be V2L (Vehicle to Load), and a configuration of supplying the AC power supply voltage from the vehicle 1 to indoor may be V2H (Vehicle to Home). With such a configuration, it is possible for the user of the vehicle 1 to use an electric appliance near the vehicle 1 or at home, using electric power supplied from the vehicle 1.

The vehicle 1 may further include a non-contact charging mechanism 30. The non-contact charging mechanism 30 may acquire electric power non-contact from ground facilities 100. The non-contact charging mechanism 30 may include a power receiving coil 31, a rectifier 32, a communication unit 33, a charging controller 34, and a charging relay R2. The communication unit 33 may perform wireless communication. The power receiving coil 31 is able to receive electric power from a power transmitting coil 103 of the ground facilities 100 by electromagnetic coupling or electromagnetic resonance in an opposed state to the power transmitting coil 103. The rectifier 32 may rectify an AC current outputted from the power receiving coil 31 and send the rectified AC current toward the power supply line Lb.

The charging relay R2 may switch the rectifier 32 and the power supply line Lb between a connected state and a disconnected state.

In one embodiment of the technology, the charging relay R2 may serve as a "second relay". In one embodiment of the technology, the power receiving coil 31 and the rectifier 32 may serve as an "electric power acquirer".

The charging controller 34 may include a single ECU, or alternatively, the charging controller 34 may include a plurality of ECUs. The charging controller 34 may communicate with the ground facilities 100 through the communication unit 33, and receive voltage data from the rectifier 32, to perform a control of the non-contact charging. The control of the non-contact charging may include a switching control of the charging relay R2.

The charging controller 34 may perform communication through a communication line Lc and cooperate with the vehicle controller 15 and the BCU 14. It is to be noted that because the vehicle controller 15 and the charging controller 34 cooperate, part of processing of the vehicle controller 15 illustrated in the example of FIG. 1 may be performed by the charging controller 34. Non-limiting examples may include the switching control of the system main relay R1, an input of the operation signal of the non-contact charging transition switch 26 and the AC power supply start switch 28, the control of the touchscreen 41, and the communication with the mobile terminal 51 through the wireless communication unit 42. Conversely, part of processing of the charging controller 34 illustrated in the example of FIG. 1, e.g., the switching control of the charging relay R2, may be performed by the vehicle controller 15. Moreover, the vehicle controller 15 and the charging controller 34 do not have to be separate from each other, but may be unified as a unitary controller.

The ground facilities 100 may include the power transmitting coil 103, an inverter 102, a communication unit 106, and a ground facility controller 105. The power transmitting coil 103 may transmit electric power in a non-contact manner. The inverter 102 may convert electric power from an external power supply and output converted electric power to the power transmitting coil 103. The communication unit 106 is able to communicate with the charging controller 34 of the vehicle 1. The ground facility controller 105 may perform a drive control of the inverter 102. The charging controller 34 of the vehicle 1 is able to send a request for excitation of the power transmitting coil 103 to the ground facility controller 105 by wireless communication of the communication units 33 and 106.

<Transition Processing to Non-Contact Charging>

Figure 2:
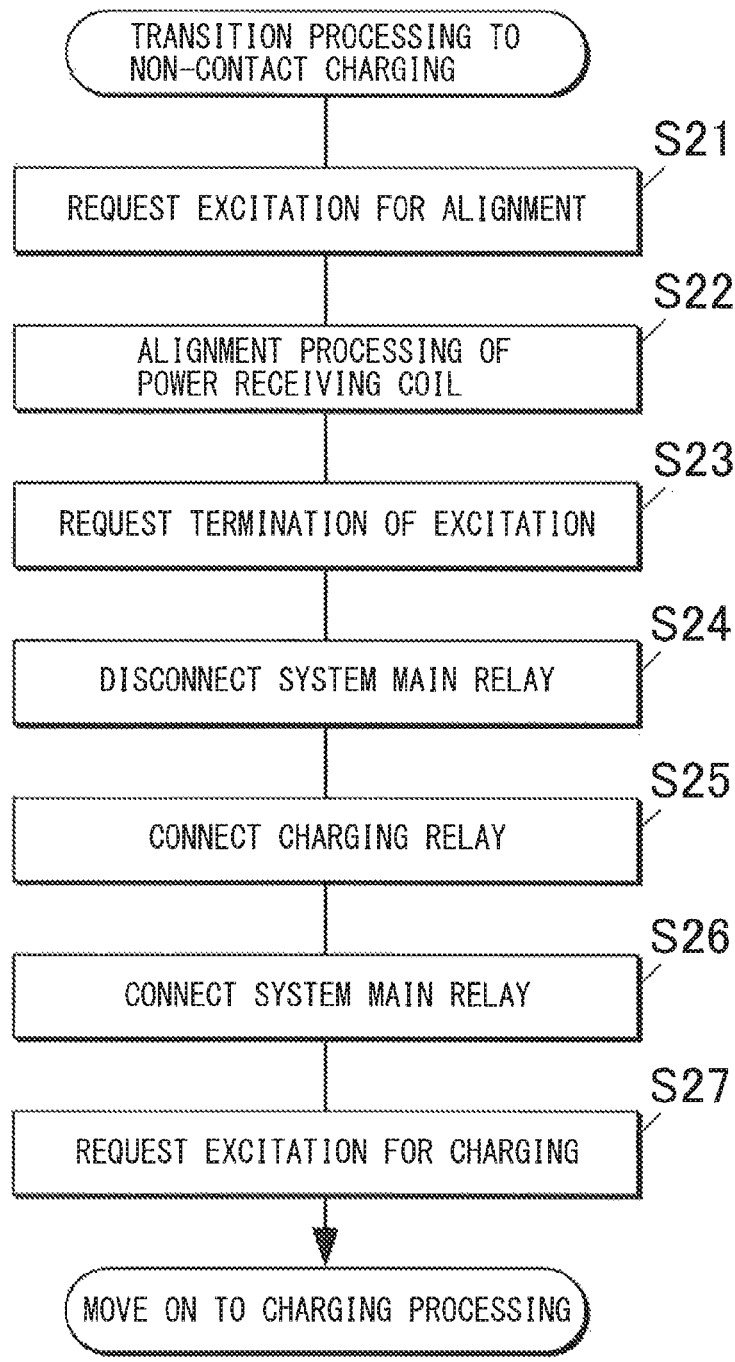
FIG. 2 is a flowchart illustrating a procedure of transition processing to non-contact charging to be executed by a charging controller.

Described next is transition processing to the non-contact charging to be executed by the charging controller 34. The transition processing to the non-contact charging may be started by an operation of the non-contact charging transition switch 26 or the mobile terminal 51 when the vehicle 1 is in the vicinity of the ground facilities 100, causing a transition command to the non-contact charging to be sent to the charging controller 34. FIG. 2 is a flowchart illustrating a procedure of the transition processing to the non-contact charging.

At the start of the transition processing to the non-contact charging, with the transition command sent, the charging controller 34 may, first, request of the ground facilities 100 excitation for alignment, through the wireless communication by the communication unit 33 (step S21). This excitation is excitation that causes alignment of the power receiving coil 31 with the power transmitting coil 103, and has much smaller intensity than excitation during the charging.

Thereafter, while monitoring induced electromotive force generated in the rectifier 32, the charging controller 34 may induce a driver to move the vehicle 1 or send a command to an automated operation function, causing the alignment of the power receiving coil 31 at an opposed position to the power transmitting coil 103 (step S22). When the vehicle 1 stops with the induced electromotive force of predetermined magnitude generated in the power receiving coil 31 because of the induction of the charging controller 34, alignment processing of step S22 may be completed. At the completion of the alignment processing, the charging controller 34 may request the ground facilities 100 to terminate the excitation, through the wireless communication by the communication unit 33 (step S23). This causes a stop of the excitation for the alignment of the power transmitting coil 103. At the completion of the alignment processing, the charging controller 34 may accumulate data regarding the completion, as history data.

The alignment processing of step S22 may be executed, with the system main relay R1 in the connected state, and with the charging relay R2 in the disconnected state.

Thereafter, in order to couple the battery 11 and the rectifier 32 through the power supply line Lb, the charging controller 34 may switch the system main relay R1 to the disconnected state (step S24), switch the charging relay R2 to the connected state (step S25), and switch the system main relay R1 again to the connected state (step S26). The switching of the system main relay R1 may be made by allowing the charging controller 34 to send a request to the vehicle controller 15 and allowing the vehicle controller 15 to make the relay switching control. With the relay switching procedure of steps S24 to S26, it is possible to couple the battery 11 and the rectifier 32 through the power supply line Lb, while avoiding an excessive current such as a rush current flowing through the charging relay R2, in switching the charging relay R2 to the connected state.

In steps S24 to S26, the system main relay R1 is temporarily brought to the disconnected state. Accordingly, if the power supply unit 25 is in use at the time of the transition processing to the non-contact charging, the power supply unit 25 and the battery 11 are temporarily isolated, causing interruption of electric power supply by the power supply unit 25.

At an end of the relay switching control of steps S24 to S26, the charging controller 34 may request of the ground facilities 100 excitation for the charging, through the wireless communication by the communication unit 33 (step S27). On the request in step S27, high excitation for the charging from the power transmitting coil 103 is carried out. This excitation causes great induced electromagnetic force to be generated in the power receiving coil 31, allowing a charging current to be transmitted to the battery 11 through the rectifier 32. Thereafter, the charging controller 34 may allow the processing to proceed to charging processing. While monitoring, for example, a state of charge, the charging controller 34 may execute the charging of the battery 11 until a condition of an end of the charging is satisfied.

<User Interface Processing>

Figure 3:
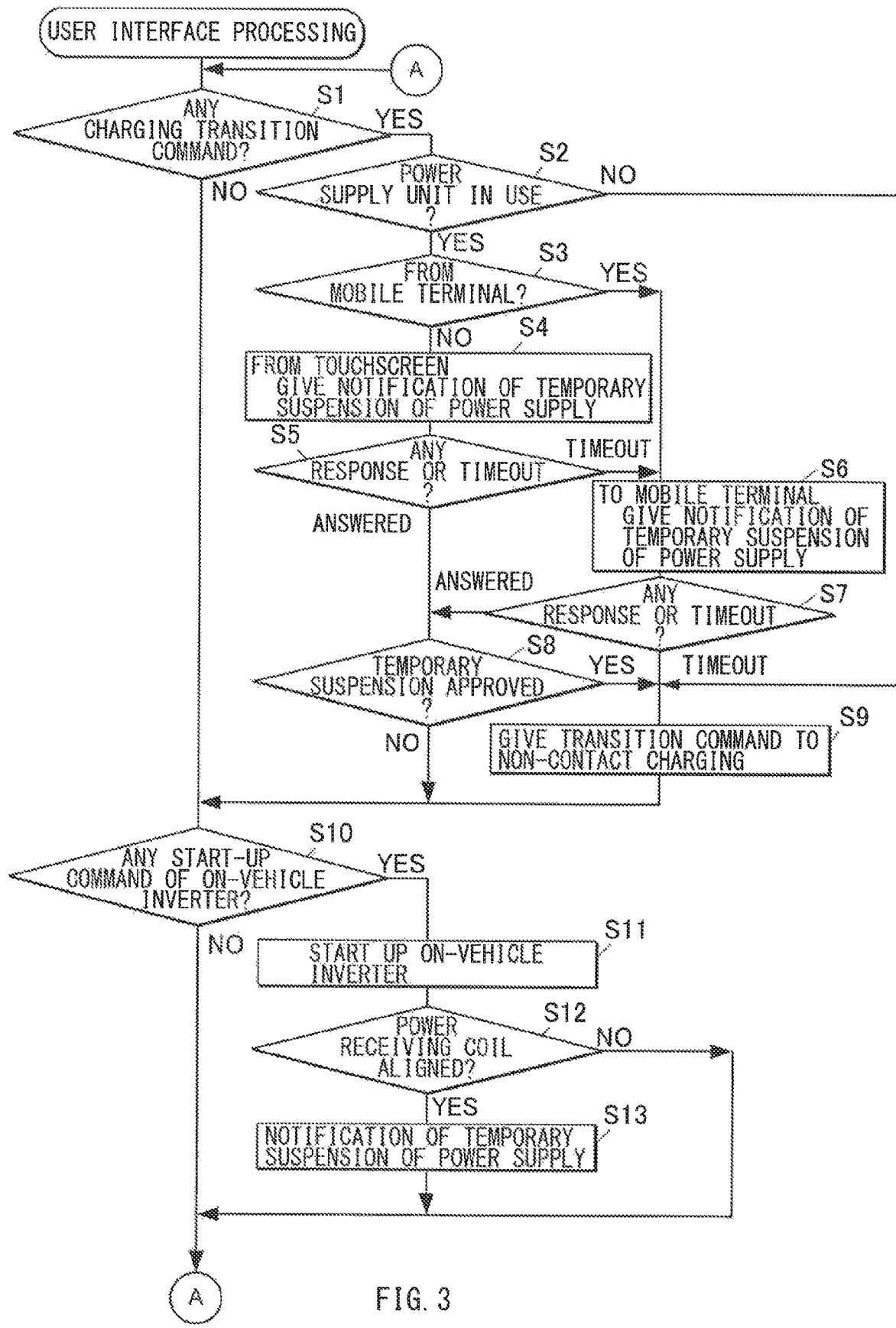
FIG. 3 is a flowchart illustrating a procedure of user interface processing to be executed by a vehicle controller.

Description now moves on to user interface processing. The user interface processing may include allowing the vehicle controller 15 to exchange data with the user. The user interface processing may be continuously executed by the vehicle controller 15 while a system of the vehicle 1 is in operation. The system of the vehicle 1 in operation means that a ready state that the vehicle 1 is available for travel, or an accessory-on state that electric power is supplied by an accessory power supply. FIG. 3 is a flowchart illustrating a procedure of the user interface processing to be executed by the vehicle controller 15.

In the user interface processing, the vehicle controller 15 may repeat loop processing including a determination as to presence or absence of the charging transition command CMD1 (step S1) and a determination as to presence or absence of the start-up command CMD2 from the AC power supply start switch 28 (step S10). In a case where the user of the vehicle 1 operates the non-contact charging transition switch 26 or the mobile terminal 51 to input the charging transition command CMD1, the vehicle controller 15 may determine the presence of the charging transition command CMD1 (step S1: YES), and allow the processing to branch out into step S2. In a case where the user of the vehicle 1 operates the AC power supply start switch 28 to input the start-up command CMD2 of the on-vehicle inverter 23, the vehicle controller 15 may determine the presence of the start-up command CMD2 (step S10; YES), and allow the processing to branch out into step S11.

With the presence of the charging transition command CMD1 (step S1: YES), the processing may branch out into step S2, in which the vehicle controller 15 may determine whether or not the power supply unit 25 is in use (step S2). In a case where the power supply unit 25 is out of use (step S2: NO), the vehicle controller 15 may allow the processing to proceed to step S9, in which the vehicle controller 15 may send the transition command to the non-contact charging to the charging controller 34 (step S9). Thus, the transition processing to the non-contact charging as described above with reference to FIG. 2 may be started.

In a case where the power supply unit 25 is in use (step S2: YES), the vehicle controller 15 may determine whether or not the charging transition command CMD1 has been sent from the mobile terminal 51 (step S3). In a case where the charging transition command CMD1 has not been sent from the mobile terminal 51 (step S3: NO), the vehicle controller 15 may give the notification of temporary suspension of the power supply, from the touchscreen 41 in the vehicle cabin (step S4). Thereafter, the vehicle controller 15 waits for a response from the user to the notification of the temporary suspension of the power supply (step S5). In a case where the charging transition command CMD1 has been sent from the mobile terminal 51 (step S3: YES) or in a case where waiting time is up in step S5, the vehicle controller 15 may output the notification of the temporary suspension of the power supply, from the mobile terminal 51 through the communication of the wireless communication unit 42 (step S6). Thereafter, the vehicle controller 15 may wait for a response from the user (step S7).

Figure 4A:
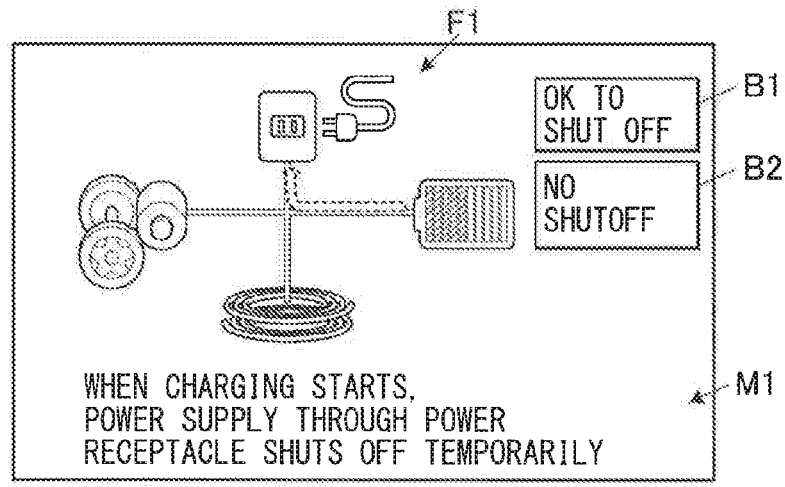
FIGS. 4A to 4C are diagrams illustrating an example of a view of a notification of temporary suspension of power supply to be outputted to a touchscreen.
Figure 4B:
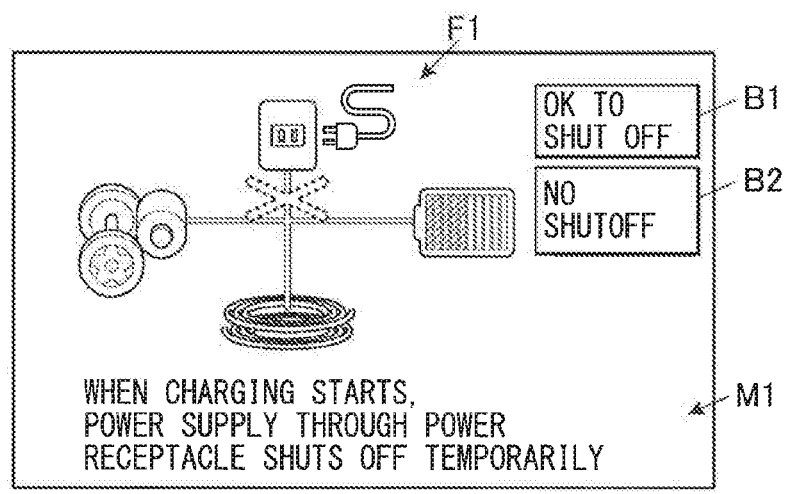
Figure 4C:
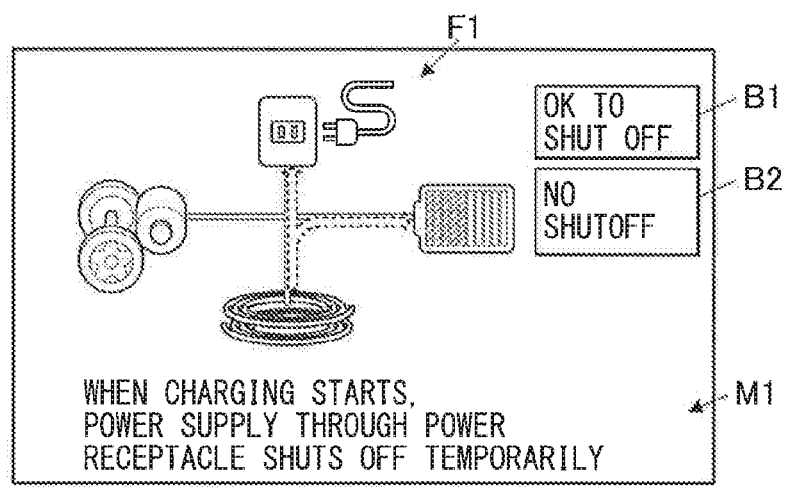

FIGS. 4A to 4C are diagrams illustrating an example of a view of the notification of the temporary suspension of the power supply to be outputted to the touchscreen 41. In the processing of the notification of the temporary suspension of the power supply in step S4 or S6, the vehicle controller 15 may repetitively output images of FIGS. 4A to 4C in an alternately switching order. The notification of the temporary suspension of the power supply may include message display M1, an energy flow diagram F1, and operation buttons B1 and B2. The message display M1 notifies the user of temporary shutoff of the power supply of the inside-cabin power receptacle at the start of the non-contact charging. The energy flow diagram F1 provides illustration of switching of electric power supply at the start of the non-contact charging. The operation buttons B1 and B2 make it possible to select whether or not to approve the interruption of the electric power supply of the power supply unit 25. The interruption of the electric power supply may be also referred to as the shutoff of the power supply.

As described in the forgoing, at the start of the non-contact charging, the system main relay R1 is temporarily switched to the disconnected state. Accordingly, in the case with the power supply unit 25 in use, the electric power supply from the power supply unit 25 is interrupted. The notification of the temporary suspension of the power supply makes it possible to give the user recognition of the interruption of the electric power supply. Furthermore, in a case where the interruption of the electric power supply causes inconvenience, it is possible for the user to select one from the operation buttons B1 and B2, to make a response of disapproval of the interruption.

In the waiting of step S5 or S7, if answered, the vehicle controller 15 may determine whether the answer selected is approval of the temporary suspension of the power supply or whether the answer selected is the disapproval of the temporary suspension of the power supply (step S8). In a case where the answer is the approval (step S8: YES), or the waiting time is up in step S7, the vehicle controller 15 may send the transition command to the non-contact charging, to the charging controller 34 (step S9). Thus, the transition processing to the non-contact charging as described above with reference to FIG. 2 may be started by the charging controller 34. Thereafter, the vehicle controller 15 may return the processing again to the loop processing including steps S1 and S10.

In a case where the answer is the disapproval (step S8: NO), the vehicle controller 15 may return the processing to the loop processing including steps S1 and S10, without outputting the transition command to the non-contact charging. Thus, the charging controller 34 does not start the transition processing to the non-contact charging, nor is the system main relay R1 temporarily disconnected.

With the presence of the start-up command CMD2 of the on-vehicle inverter 23 (step S10: YES), the processing may branch out into step S11, in which the vehicle controller 15 may, first, start up the on-vehicle inverter 23 (step S11). Thereafter, the vehicle controller 15 may make an inquiry of the charging controller 34, to determine whether or not the alignment of the power receiving coil 31 for the non-contact charging has been completed (step S12). In step S12, the vehicle controller 15 is able to determine whether or not the power receiving coil 31 has been aligned in position, on the basis of the history data regarding the alignment and travel history data of the vehicle 1. The history data regarding the alignment may be held by the charging controller 34. The travel history data of the vehicle 1 may be held by the vehicle controller 15.

As a result of the determination of step S12, in a case where the alignment processing has not been made yet (step S12: NO), the vehicle controller 15 may promptly return the processing to the loop processing including steps S1 and S10. In a case where the alignment processing has been completed (step S12: YES), the vehicle controller 15 may give the notification of the temporary suspension of the power supply (step S13).

The notification of the temporary suspension of the power supply in step S13 may include, for example, outputting the images except for the operation buttons B1 and B2 out of the images of the notification of the temporary suspension of the power supply illustrated in FIGS. 4A to 4C. The notification of the temporary suspension of the power supply in step S13 may be outputted from the touchscreen 41 or the mobile terminal 51. In the case where the alignment of the power receiving coil 31 has been completed (step S12: YES), there is possibility that afterwards, without moving the vehicle 1, the relay switching control is made to start the non-contact charging, in which case the electric power supply from the on-vehicle inverter 23 that has started up in step S11 is interrupted. The notification of the temporary suspension of the power supply in step S13 makes it possible for the user to anticipate such interruption of the electric power supply. Even if the user is planning the non-contact charging, it is possible for the user to take an appropriate action as follows. For example, the user may cancel the non-contact charging in accordance with a device to be used, or alternatively, the user may start the non-contact charging before driving an electric device.

After giving the notification of the temporary suspension of the power supply in step S13, the vehicle controller 15 may return the processing to step S1, and repeat the loop processing including steps S1 and S10.

As described, according to the vehicle 1 of this embodiment, in the case with the presence of the charging transition command CMD1 to make the transition to the charging of the battery 11, the vehicle controller 15 gives the notification of the temporary suspension of the power supply, to notify the user of the temporary suspension of the power supply unit 25 because of the start of the non-contact charging. On the basis of this notification, the user is able to anticipate the interruption of the electric power supply to the device the user is using. Hence, it is possible to alleviate the sense of incongruity given to the user, in the case where the device shuts down because of the interruption of the electric power supply.

Moreover, according to the vehicle 1 of this embodiment, before proceeding to the non-contact charging of the battery 11, the vehicle controller 15 may determine the state of use of the power supply unit 25 (step S2 in FIG. 3). In accordance with the result of this determination, the vehicle controller 15 may switch whether or not to issue the notification (steps S4 and S6 in FIG. 3). Hence, it is possible to save an unnecessary notification in a case where the temporary shutdown of the power supply unit 25 does not give the user the sense of incongruity, e.g., in the case where the user is not using the power supply unit 25.

Furthermore, according to the vehicle 1 of this embodiment, in issuing the notification of the temporary suspension of the power supply, the vehicle controller 15 may allow the user to make the selection as to whether or not to approve the interruption of the electric power supply. On the basis of the result of this selection, the vehicle controller 15 may determine whether or not to send the transition command to the non-contact charging to the charging controller 34 (steps S8 and S9 in FIG. 3). By this determination, the switching may be made as to whether or not to allow the charging controller 34 to execute the non-contact charging processing, i.e., the transition processing to the non-contact charging inclusive of the switching of the system main relay R1 and the charging relay R2. This makes it possible for the user to cancel the execution of the non-contact charging and continue the electric power supply to the device in the case where the interruption of the electric power supply is unacceptable, e.g., in a case where the user is using a device interruption of electric power supply to which causes inconvenience.

In addition, according to the vehicle 1 of this embodiment, the vehicle controller 15 may give the notification of the temporary suspension of the power supply to the touchscreen 41 in the vehicle cabin. Thereafter, in the case without any answer as to whether or not to approve the temporary suspension of the power supply, the vehicle controller 15 may give the notification of the temporary suspension of the power supply to the mobile terminal 51 (steps S4 to S6 in FIG. 3). With such processing, it is possible to make sufficient confirmation of the user's intention. It is also possible to avoid the situation that the notification is sent to the mobile terminal 51 more than necessary and bothers the user.

Moreover, according to the vehicle 1 of this embodiment, the notification of the temporary suspension of the power supply may include the energy flow diagram F1 that provides the illustration of the switching of the electric power supply. Hence, it is possible to give the user the intuitive recognition that the start of the non-contact charging causes the interruption of the power supply from the power supply unit 25.

Furthermore, according to the vehicle 1 of this embodiment, the user is allowed to send the charging transition command CMD1 to the vehicle controller 15 from the non-contact charging transition switch 26 inside the vehicle cabin and from the mobile terminal 51. In addition, in the case where the charging transition command CMD1 is inputted from the non-contact charging transition switch 26, the vehicle controller 15 may give the notification of the temporary suspension of the power supply to the touchscreen 41 inside the vehicle cabin. In the case where the charging transition command CMD1 is inputted from the mobile terminal 51, the vehicle controller 15 may give the notification of the temporary suspension of the power supply to the mobile terminal 51. Hence, it is possible to issue the notification according to location of the user.

In addition, according to the vehicle 1 of this embodiment, in the case with the presence of the start-up command CMD2 of the power supply unit 25, or the on-vehicle inverter 23, with the alignment of the power receiving coil 31 completed, the vehicle controller 15 may notify the user of the data regarding the interruption of the power supply of the power supply unit 25 at the start of the charging. In the case where the alignment of the power receiving coil 31 has been completed, there are cases where the non-contact charging is started by the afterward operation by the user, and cases where the non-contact charging is started without the user's operation. Accordingly, issuing the notification at the start-up of the power supply unit 25 as described above makes it possible to avoid the situation that an afterward start of the non-contact charging causes the interruption of the power supply of the power supply unit 25 without the user's anticipation.

Although some preferred but non-limiting embodiments of the technology are described above by way of example with reference to the accompanying drawings, the technology is by no means limited to the embodiments described above. It should be appreciated that modifications and alterations may be made by persons skilled in the art without departing from the scope as defined by the appended claims.

For example, some vehicles may include two kinds of power supply units: a power supply unit interruption of electric power supply to which is permissible, e.g., an inverter for air conditioner and a heater switch; and a power supply unit to which an electric device interruption of electric power supply to which is impermissible, e.g., an on-vehicle inverter, may be possibly coupled. In the forgoing embodiment, described is a configuration in which the inverter for air conditioner, the on-vehicle inverter, and the heater switch may all serve as a "power supply unit" of the technology, and the notification of the temporary suspension of the power supply regarding these is made. In an alternative example, out of such power supply units, solely some specific power supply unit interruption of electric power supply to which is sometimes impermissible may serve as a "power supply unit" of the technology. The notification of the temporary suspension of the power supply may be made solely regarding such a specific power supply unit.

Moreover, the forgoing embodiment exemplifies a configuration with an "electric power acquirer" of the technology configured to perform non-contact electric power transmission. However, the "electric power acquirer" of the technology may be configured to transmit electric power from an external power supply by wired connection. For example, in a vehicle that charges a battery by acquiring a DC power supply voltage from outside, the "electric power acquirer" to which the DC power supply voltage is inputted may have a configuration in which the power receiving coil and the rectifier in the non-contact charging mechanism are replaced with a wired power line and the communication unit is replaced with a communication unit of a wired method. Otherwise, the "electric power acquirer" may include substantially similar constituent elements to those of the non-contact charging mechanism. Accordingly, the technology is applicable to vehicles that charge a battery from a DC power supply through wired connection, with the similar configurations and control methods as those of the forgoing embodiment.

Furthermore, in the forgoing embodiment, given is an example where the notification of the temporary shutdown of the power supply unit is outputted and displayed on the touchscreen 41. However, the notification may be made by sound, or alternatively, the notification may be made both by sound and by display. In addition, the details described in the forgoing embodiments may be appropriately changed insofar as the changes fall within a range not departing from the scope of the technology.

According to the aspect of the technology, in a case with high possibility of temporary shutdown of a power supply unit, a first notification processor or a second notification processor gives a user a notification thereof. This makes it possible for the user to anticipate interruption of electric power supply in advance. Hence, it is possible to alleviate the sense of incongruity given to the user even in a case where a device the user is using shuts down.

The charging controller 34 and the vehicle controller 15 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the charging controller 34 and the vehicle controller 15. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the charging controller 34 and the vehicle controller 15 illustrated in FIG. 1.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. A vehicle wireless power charging system, comprising:
   a battery configured to accumulate electric power for travel of the vehicle;
   an electric power acquirer configured to acquire charging electric power from outside;
   a power supply unit able to provide a power supply from the battery to a device other than a traveling motor;
   a first relay configured to connect the battery to a power supply line or to disconnect the battery from the power supply line;
   a second relay configured to connect the electric power acquirer to the power supply line or to disconnect the electric power acquirer from the power supply line;
   a charging controller configured to switch, on a request for charging of the battery with the first relay in a connected state, the first relay to a disconnected state, bring the second relay to a connected state, and switch the first relay to a connected state to start the charging of the battery; and
   a first notification processor configured to give, on the request for the charging of the battery, a user a notification of temporary shutdown of the power supply unit at a start of the charging of the battery.

2. The vehicle according to claim 1, further comprising a determination unit configured to make a determination, before the charging of the battery, as to a state of use of the power supply unit, wherein
   the first notification processor switches whether or not to issue the notification on a basis of a result of the determination of the determination unit.

3. The vehicle according to claim 1, wherein
   the first notification processor acquires data regarding the user's approval or disapproval of the temporary shutdown of the power supply unit, and
   the charging controller switches whether or not to execute the charging of the battery on a basis of the data acquired by the first notification processor regarding the user's approval or disapproval of the temporary shutdown of the power supply unit.

4. The vehicle according to claim 2, wherein
   the first notification processor acquires data regarding the user's approval or disapproval of the temporary shutdown of the power supply unit, and
   the charging controller switches whether or not to execute the charging of the battery on a basis of the data acquired by the first notification processor regarding the user's approval or disapproval of the temporary shutdown of the power supply unit.

5. The vehicle according to claim 3, wherein the first notification processor transmits data regarding the notification to a mobile terminal, on a condition that the first notification processor fails to acquire the data regarding the user's approval or disapproval of the temporary shutdown of the power supply unit.

6. The vehicle according to claim 4, wherein the first notification processor transmits data regarding the notification to a mobile terminal, on a condition that the first notification processor fails to acquire the data regarding the user's approval or disapproval of the temporary shutdown of the power supply unit.

7. The vehicle according to claim 1, wherein the first notification processor outputs an image that represents switching of electric power supply, concurrently with the notification.

8. The vehicle according to claim 2, wherein the first notification processor outputs an image that represents switching of electric power supply, concurrently with the notification.

9. The vehicle according to claim 3, wherein the first notification processor outputs an image that represents switching of electric power supply, concurrently with the notification.

10. The vehicle according to claim 4, wherein the first notification processor outputs an image that represents switching of electric power supply, concurrently with the notification.

11. The vehicle according to claim 5, wherein the first notification processor outputs an image that represents switching of electric power supply, concurrently with the notification.

12. The vehicle according to claim 6, wherein the first notification processor outputs an image that represents switching of electric power supply, concurrently with the notification.

13. The vehicle according to claim 1, further comprising:
    a charging transition switch able to accept an operation by the user and configured to transmit the request for the charging;
    an output unit configured to output an image or sound; and
    a wireless communication unit able to communicate with a mobile terminal,
    wherein the first notification processor gives the notification through the output unit on the request for the charging from the charging transition switch, and gives the notification through the mobile terminal on the request for the charging from the mobile terminal.

14. The vehicle according to claim 2, further comprising:
    a charging transition switch able to accept an operation by the user and configured to transmit the request for the charging;
    an output unit configured to output an image or sound; and
    a wireless communication unit able to communicate with a mobile terminal,
    wherein the first notification processor gives the notification through the output unit on the request for the charging from the charging transition switch, and gives the notification through the mobile terminal on the request for the charging from the mobile terminal.

15. The vehicle according to claim 3, further comprising:
    a charging transition switch able to accept an operation by the user and configured to transmit the request for the charging;
    an output unit configured to output an image or sound; and
    a wireless communication unit able to communicate with a mobile terminal,
    wherein the first notification processor gives the notification through the output unit on the request for the charging from the charging transition switch, and gives the notification through the mobile terminal on the request for the charging from the mobile terminal.

16. The vehicle according to claim 4, further comprising:
    a charging transition switch able to accept an operation by the user and configured to transmit the request for the charging;
    an output unit configured to output an image or sound; and
    a wireless communication unit able to communicate with a mobile terminal, wherein the first notification processor gives the notification through the output unit on the request for the charging from the charging transition switch, and gives the notification through the mobile terminal on the request for the charging from the mobile terminal.

17. A vehicle wireless power charging system, comprising:
- a battery configured to accumulate electric power for travel of the vehicle;
- an electric power acquirer that includes a power receiving coil and is configured to acquire charging electric power non-contact through the power receiving coil;
- a power supply unit able to provide a power supply from the battery to a device other than a traveling motor;
- a first relay configured to connect the battery to a power supply line or to disconnect the battery from the power supply line;
- a second relay configured to connect the electric power acquirer to the power supply line or to disconnect the electric power acquirer from the power supply line; and
- a notification processor configured to give a user a notification of temporary shutdown of the power supply unit at a start of charging of the battery, on a condition that a command to start up the power supply unit is made with the power-receiving coil positioned to be available for electric power reception from a power transmitting coil of ground facilities.

\* \* \* \* \*